(12) United States Patent
Lin et al.

(10) Patent No.: US 11,847,021 B2
(45) Date of Patent: Dec. 19, 2023

(54) MEMORY BLOCK, MEMORY DEVICE FOR ERROR CORRECTION OPERATION AND METHOD THEREOF

(71) Applicant: MACRONIX INTERNATIONAL CO., LTD., Hsinchu (TW)

(72) Inventors: Yu-Yu Lin, New Taipei (TW); Feng-Min Lee, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 17/680,388

(22) Filed: Feb. 25, 2022

(65) Prior Publication Data

US 2023/0273737 A1    Aug. 31, 2023

(51) Int. Cl.
  *G06F 12/00*  (2006.01)
  *G06F 11/10*  (2006.01)
  *G06F 3/06*   (2006.01)
(52) U.S. Cl.
  CPC .......... *G06F 11/1004* (2013.01); *G06F 3/064* (2013.01); *G06F 3/0619* (2013.01); *G06F 3/0673* (2013.01)

(58) Field of Classification Search
  None
  See application file for complete search history.

(56) References Cited

U.S. PATENT DOCUMENTS

| 7,900,117 | B2 | 3/2011 | Kanno |
| 9,201,785 | B2 | 12/2015 | Tan et al. |
| 2009/0028231 | A1 | 1/2009 | Lee et al. |
| 2011/0161554 | A1* | 6/2011 | Selinger ............. G06F 13/1668 |
| | | | 711/E12.001 |
| 2020/0387423 | A1* | 12/2020 | Chen .................... G06F 11/106 |
| 2022/0208277 | A1* | 6/2022 | Liu ...................... G06F 11/1068 |

FOREIGN PATENT DOCUMENTS

| TW | 200917265 A | 4/2009 |
| TW | 201447577 A | 12/2014 |
| TW | 202038248 A | 10/2020 |

\* cited by examiner

*Primary Examiner* — Daniel D Tsui
(74) *Attorney, Agent, or Firm* — McClure, Qualey & Rodack, LLP

(57) ABSTRACT

An operation method of memory device, comprising: selecting a target block for performing an error correction operation; reading the target block row by row; transmitting the read data to an error correction circuit; and checking and correcting read data to generate a corrected data.

15 Claims, 9 Drawing Sheets

MEMORY BLOCK, MEMORY DEVICE FOR ERROR CORRECTION OPERATION AND METHOD THEREOF

The disclosure relates to a memory block, a memory device and an operation method thereof.

BACKGROUND

In-memory search (IMS) is widely applied to various fields such as artificial intelligence, big data and IP search. However, the data stored in the memory may have error bits due to various reasons. While the stored data have error bits, the reliability of search results would be affected. Therefore, in order to ensure the reliability of search results, it is necessary to solve the problem of error bits in the data stored in in-memory search array.

SUMMARY

An embodiment of the present disclosure discloses a memory device. The memory device comprises a plurality of memory blocks, a plurality of driving circuit, an error correction circuit and a control circuit. Each of the memory blocks comprises a plurality of memory units. The driving circuits are coupled to the memory blocks. The error correction circuit is coupled to the memory blocks. The control circuit is coupled to the driving circuits and the error correction circuit, configured to select one of the memory blocks as a target block, and perform an error correction operation on the target block. The memory units of the target block have a plurality of columns and a plurality of rows. The columns comprise at least one data column and at least one check column. Data stored in the memory units of the at least one data column is user data. Data stored in the memory units of the at least one check column is check codes. The at least one check code stored in each of the rows of the memory units is generated according to the user data stored in the same row of the memory units. The error correction operation comprises reading the rows of the memory units of the target block row by row, transmitting the data stored in the rows of the memory units of the target block to the error correction circuit, checking and correcting, by the error correction circuit, whether the user data stored in each of the rows of the memory units has error bit according to the at least one check code stored in each of the rows of the memory units to generate a corrected data.

Another embodiment of the present disclosure discloses an operation method of memory device, comprising: selecting one of a plurality of memory blocks as a target block for performing an error correction operation, the target block comprising a plurality of memory units, the memory units having a plurality of columns and a plurality of rows, the columns comprising at least one data column and at least one check column, data stored in the memory units of the at least one data column being user data, data stored in the memory units of the at least one check column being check codes, the at least one check code stored in each of the rows of the memory units generated according to the user data stored in the same row of the memory units; reading the rows of the memory units of the target block row by row; transmitting the data stored in the rows of the memory units of the target block to the error correction circuit; and checking and correcting, by the error correction circuit, whether the user data stored in each of the rows of the memory units has error bit according to the at least one check code stored in each of the rows of the memory units to generate a corrected data.

Yet another embodiment of the present disclosure discloses a memory block. The memory block comprises a plurality of memory units. The memory units have a plurality of columns and a plurality of rows. The rows of the memory units are coupled to a first driving circuit via a plurality of first signal lines. The columns of the memory units are coupled to a second driving circuit via a plurality of second signal lines and coupled to a sensing circuit via a plurality of third signal lines. The memory units are further coupled to an error correction circuit. The columns comprise at least one data column and at least one check column. Data stored in the memory units of the at least one data column is user data. Data stored in the memory units of the at least one check column is check codes. The at least one check code stored in each of the rows of the memory units is generated according to the user data stored in the same row of the memory units.

The above and other aspects of the disclosure will become better understood with regard to the following detailed description of the preferred but non-limiting embodiment(s). The following description is made with reference to the accompanying drawings.

DETAILED DESCRIPTION

Figure 1:
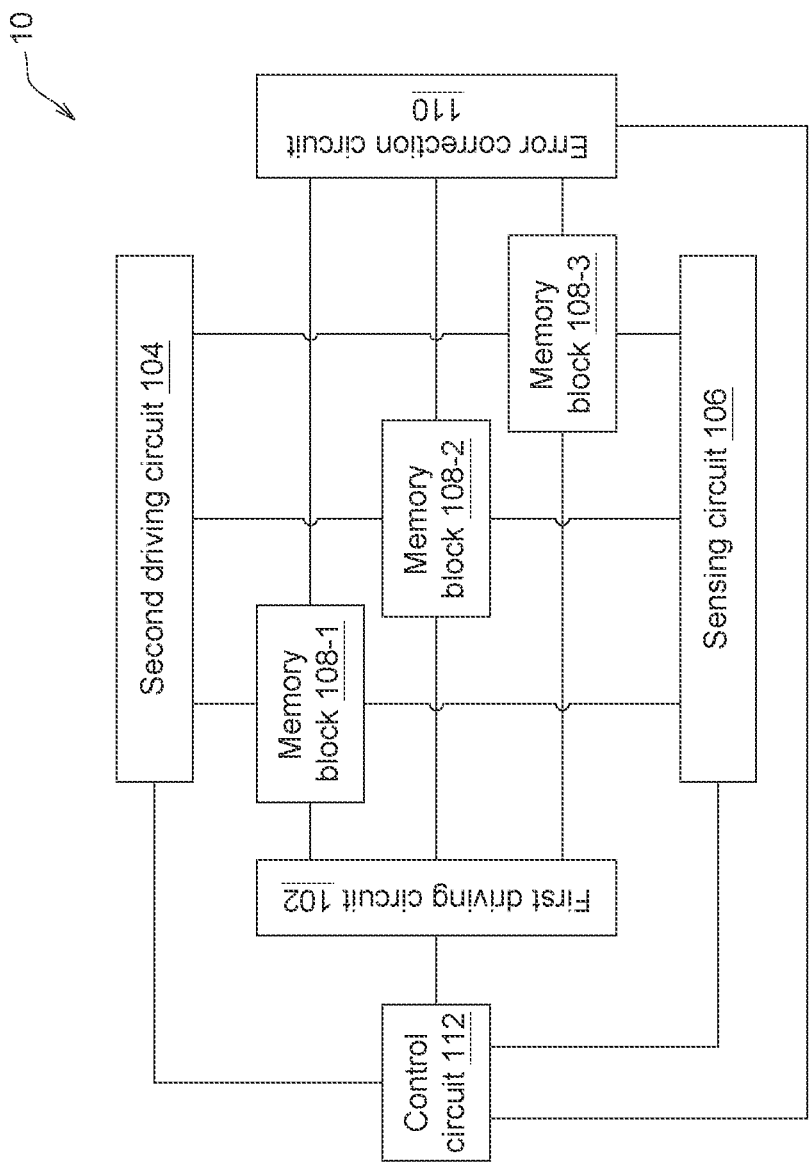
FIG. 1 shows a block diagram of memory device according to an embodiment of the present disclosure.

Referring to FIG. 1, FIG. 1 shows a block diagram of memory device according to an embodiment of the present disclosure. The memory device 10 includes a first driving circuit 102, a second driving circuit 104, a sensing circuit 106, a number of memory blocks 108-1~108-2, an error correction circuit 110 and a control circuit 112. Noted that, in FIG. 1, the arrangement of the memory blocks 108-1~108-3 and the position of the circuit blocks is arranged based on the purpose of clearly chowing the connection and is not used to limit the present disclosure, and may be different form the actual configuration. In addition, the amount of the memory blocks would not be limited by the present disclosure.

Each of the memory blocks 108-1~108-3 is coupled to the first driving circuit 102 via a number of first signal lines, coupled to the second driving circuit 104 via a number of second signal lines, and coupled to the sensing circuit 106 via a number of third signal lines. In an embodiment, the first signal lines are word lines or search lines, the second signal lines are bit lines, the third signal line are match lines, the first driving circuit 102 is a word line driving circuit, and the second driving circuit 104 is a bit line driving circuit.

Figure 2:
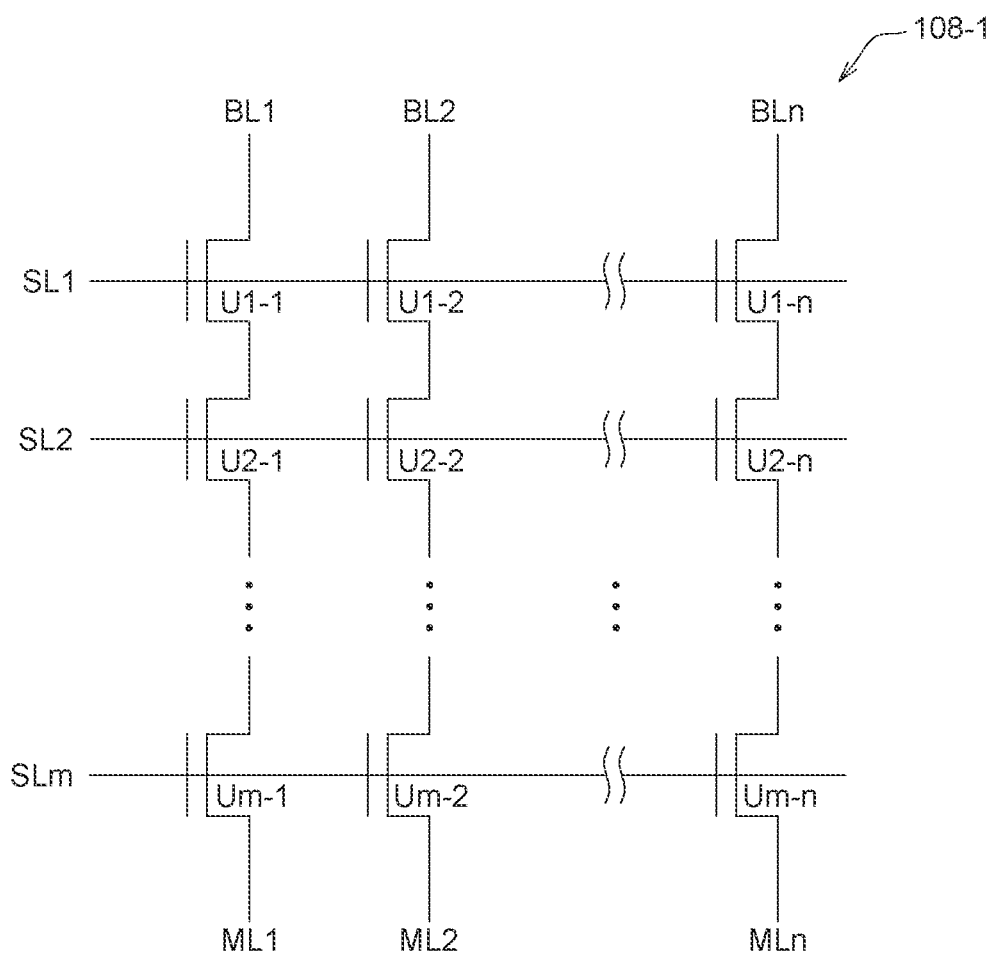
FIG. 2 shows a schematic diagram of memory block according to an embodiment of the present disclosure.

Referring to a schematic diagram of memory block according to an embodiment of the present disclosure shown in FIG. 2. Since the memory blocks 108-1~108-3 have similar structure, FIG. 2 would only show the memory block 108-1. The memory block 108-1 includes a number of memory units U1-1~Um-n. The memory units U1-1~Um-n could be resistive storage elements, ferroelectric transistors, floating gate transistors and so on. The memory units U1-1~Um-n form an in-memory search array • (IMS array). The memory units U1-1~Um-n are configured as m rows and n columns, wherein m, n are positive integers. The memory units of the i-th row is coupled to the first driving circuit 102 via the first signal line SLi, wherein i= 1, 2, . . . , m. The memory units of the j-th column are coupled to the second driving circuit 104 via the second signal line BLj, and coupled to the sensing circuit 106 via the third signal line MLj, wherein j=1, 2, . . . , n.

The memory units U1-1~Um-n could be respectively programmed as one of two different states, to store data representing 0 or 1. Take the floating gate transistor as an example, the stat is determined based on threshold voltage. The two different states are high threshold voltage and low threshold voltage, wherein low threshold voltage could represent one of 0 and 1, and high threshold voltage could represent the other one of 0 and 1.

In an embodiment, one memory unit may be configured as a memory cell. Based on the state of the memory unit, one memory cell could be configured to store data representing 0 or 1. This type architecture is called as content addressable memory, (CAM).

In another embodiment, two memory units may be configured as a memory cell. For example, the memorys unit U1-1, U2-1 could be configured as a memory cell, the memory units U1-2, U2-2 could be configured as another memory cell, etc. Based on the combination of states of two memory units, one memory cell could be configured to store data representing 0, 1 or "don't care". This type architecture is called as ternary content addressable memory (TCAM).

Noted that, in some embodiments, taking a TCAM that stores the feature values of multiple pictures as an example, the data stored in the memory cell may represent one bit of the feature value of a picture, while the data stored in a single memory unit has no specific meaning. However, the correctness of data has nothing to do with the specific meaning of data. As long as the data stored in the memory units are correct, the data stored in the memory cells composed of the memory units would be correct. In other words, the data stored in each row of the memory units is correct, and the data stored in each column of the memory units would also be correct. Therefore, the data described in the following article refers to the data stored in the memory units.

The error correction circuit 110 is coupled to the memory blocks 108-1~108-3. The details of the error correction circuit 110 would be described hereafter.

The control circuit 112 is coupled to the first driving circuit 102, the second driving circuit 104, the sensing circuit 106 and the error correction circuit 110. The control circuit 112 is configured to control the operation of the first driving circuit 102, the second driving circuit 104, the sensing circuit 106 and the error correction circuit 110 by signals.

The operations could be performed by the memory device 10 include the basic operations of CAM and TCAM such as programming operation, read operation, erase operation and search operation. The programming operation and the erase operation could be implemented by the control circuit 112 controlling the first driving circuit 102 and the second driving circuit 104 to respectively apply suitable bias to the first signal lines SL1~SLm and the second signal lines BL1~BLn. The read operation and the search operation could be implemented by the control circuit 112 controlling the first driving circuit 102 and the second driving circuit 104 to respectively apply suitable bias to the first signal lines SL1~SLm and the second signal lines BL1~BLn, and the controlling the sensing circuit 106 to sense the currents from the third signal lines ML1~MLn. In the search operation, the bias applied to the first signal lines SL1~SLm by the first driving circuit 102 represents the data to be searched, and the sensing circuit 106 determines whether the data stored in the memory units of any row matches the data to be searched based on the currents flowing out from the third signal lines ML11~MLn. Noted that the specific implementation of programming operation, read operation, erase operation and search operation would depend on the type of memory device 10 (e.g., NOR type, NAND type) and the type of memory unit (e.g., resistive storage element, ferroelectric transistor, floating gate transistor) and other factors. Noted that while some of the memory blocks are performing the search operation, other memory blocks could be in an idle state or perform operations other than the search operation. The idle state means that the memory block is not performing the programming operation, the read operation, the erase operation, the search operations and an error correction operation that would be described below.

The memory device 10 could further perform error correction operation.

Figure 3:
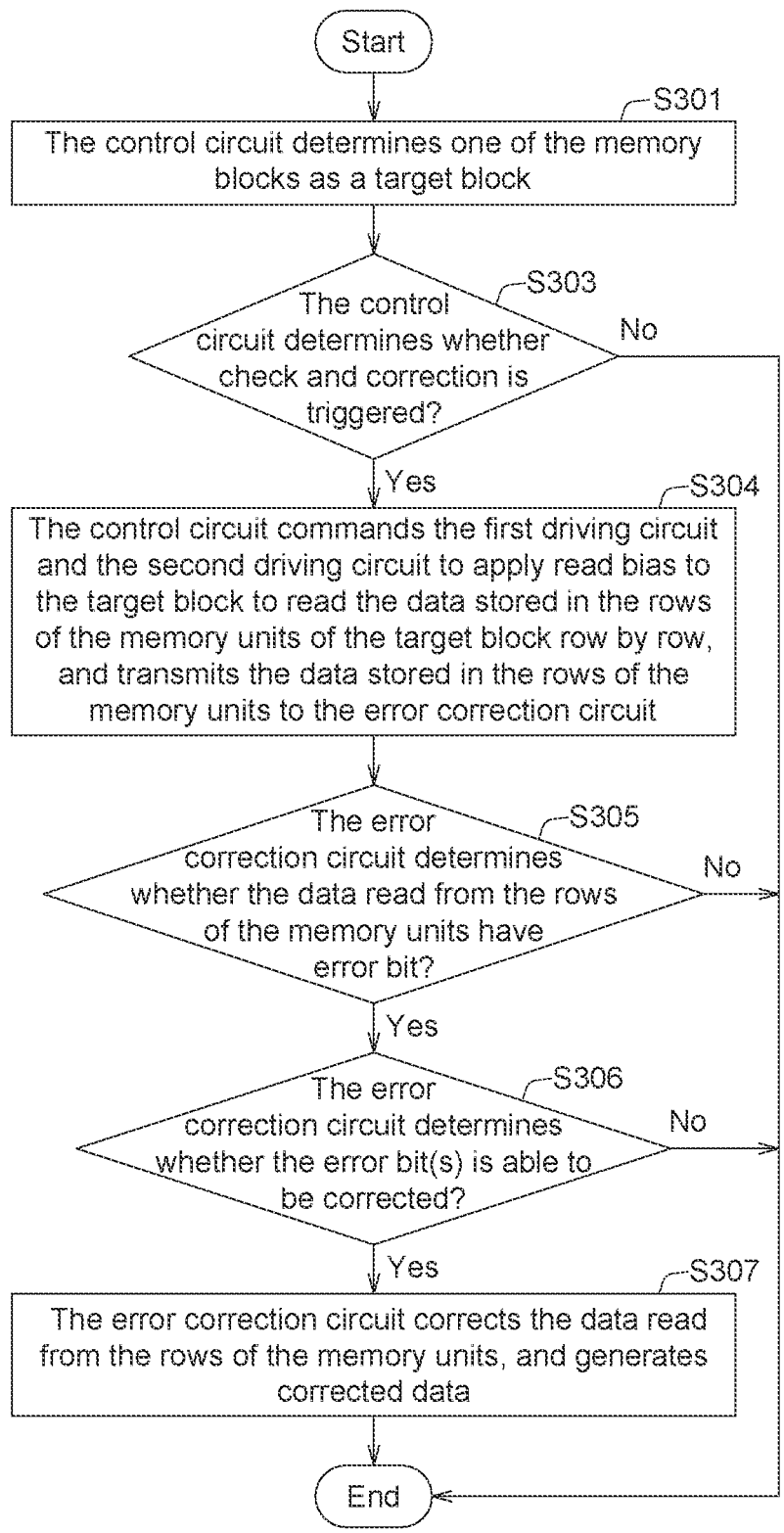
FIG. 3 shows a flowchart of operation method of memory device according to an embodiment of the present disclosure.

Referring to FIG. 3, FIG. 3 shows a flowchart of an operation method of memory device according to an embodiment of the present disclosure. The method is for error checking and correction of the data stored in the memory block.

At step S301, the control circuit 112 determines one of the memory blocks 108-1~108-3 as a target block. The control circuit 112 could select the memory block in the idle state from the memory blocks 108-1~108-3 as the target block. For example, it is assumed that the memory block 108-2 is performing the search operation, the memory blocks 108-1 and 108-3 do not perform any operation, and the control circuit 112 selects the memory block 108-1 as the target block. In an embodiment, the data set stored in the memory block 108-1 is shown in FIG. 4.

Figure 4:
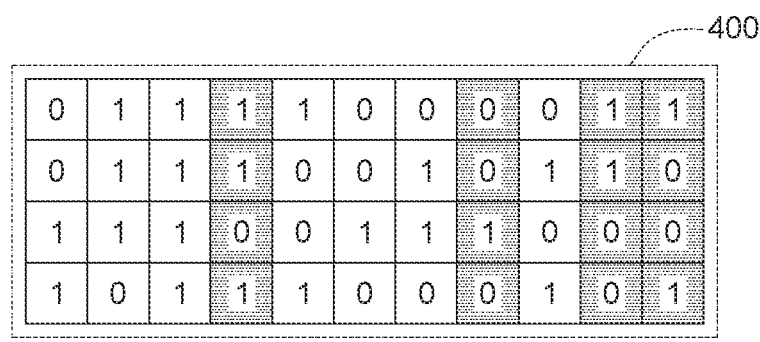
FIG. 4 shows a schematic diagram of data set stored in the memory block.

Referring to FIG. 4, FIG. 4 shows a schematic diagram of the data set stored in the memory block according to an embodiment of the present disclosure. The data set 400 is stored in the memory units of the memory block 108-1. For example, the four rows of data from the above are respectively stored in the four rows of the memory units of the memory block 108-1 corresponding to the first signal lines SL1~SL4, the eleven columns of data from the left are respectively stored in the eleven columns of the memory units of the memory block 108-1 corresponding to the second signal lines BL1~BL11. For example, the first column of data 0011 from the left is stored in the memory units U1-1~U4-1 corresponding to the first signal line BL1, wherein the memory unit U1-1 stores 0, the memory unit U2-1 stores 0, the memory unit U3-1 stores 1 and the memory unit U4-1 stores 1. For the convenience of description, "the memory units corresponding to a specific signal line" would be described as "the memory units on a specific signal line". For example, the memory units U1-1~U1-$n$ corresponding to the first signal line SL1 would be described as the memory units U1-1~U1-n on the first signal line SL1; the memory units U1-1~Um-1 corresponding to the second signal line BL1 (or the third signal line ML1) would be described as the memory units U1-1~U1-n on the second signal line BL1 (or the third signal line ML1). In this embodiment, at least one column of the memory units of the memory block 108-1 is configured as data column, and at least one column of the memory units of the memory block 108-1 is configured as check column. The data stored in the data column is user data, and the data stored in the check column is check codes. The user data could be feature values of pictures, IP addresses and so on. In the data set 400, from the left, the first column is user data 0011, the second column is user data 1110, the third column is user data 1111, the fourth column is check codes 1101, the fifth column is user data 1001, the sixth column is user data 0010, the seventh column is user data 0110, the eighth column is check codes 0010, the ninth column is user data 0101, the tenth column is check codes 1100, and the eleventh column is check codes 1001, the bits of check codes are represented by dotted blocks. That is, in the memory block 108-1, the memory units on the first signal lines BL1~BL3, BL5~BL7, BL9 are data columns, storing the user data, and the memory units on the first signal line BL4, BL8, BL10, BL11 are check columns, storing the check codes. For each row of the data, the included check codes are generated based on the user data on the same row. For example, in the data of the first row from the above, the fourth, eight, tenth and eleventh bits are check codes, and these check codes are generated based on the user data of the first, second, third, fifth, sixth, seventh and ninth bits belonging to the same row. The algorithm for generating the check codes could be Reed-Solomon code, parity check code, check sum, cyclic redundancy code or any well-known and applicable algorithm.

At step S303, the control circuit 112 determines whether check and correction is triggered. If no, end the process; if yes, perform S303. The control circuit 112 could determine whether check and correction is triggered based on parameters of the target block such as a read times, a searched times, maintenance of the data (the time elapsed after the data is programmed). For example, while the read times, the searched times or the maintenance of the data is greater than a corresponding threshold, the control circuit 112 would determine to trigger check and correction for the target block.

At step S304, the control circuit 112 commands the first driving circuit 102 and the second driving circuit 104 to apply read bias to the target block (the memory block 108-1) to read the data stored in the rows of the memory units of the target block row by row, and transmits the data stored in the rows of the memory units to the error correction circuit 110.

At step S305, the error correction circuit 110 determines whether the data read from the rows of the memory units have error bit. If yes, perform S306; if no, end the process.

At step S306, the error correction circuit 110 determines whether the error bit(s) is able to be corrected. If yes, perform S307; if no, end the process. Any error correction code has an error correction rate. When the amount of the error bits exceeds the error bits that the used error correction code could correct, the error bits could not be corrected even if error is known to exist.

At step S307, the error correction circuit 110 corrects the data read from the rows of the memory units, and generates (outputs) corrected data.

Referring to FIGS. 5A-5D, FIGS. 5A-5D show schematic diagrams of reading out the data in the target block row by row and transmitting to the error correction circuit for checking and correction. The data set 500 shown in FIGS. 5A-5D is formed due to an error bit in the data set 400 shown in FIG. 4. In this embodiment, the error bit occurred in the data stored in the memory unit U2-3. That is, in data set 500, the data bit 502 is actually the error bit. The data bit in the data set 400 is 1, and in the data set 500 is 0 (error).

Figure 5A:
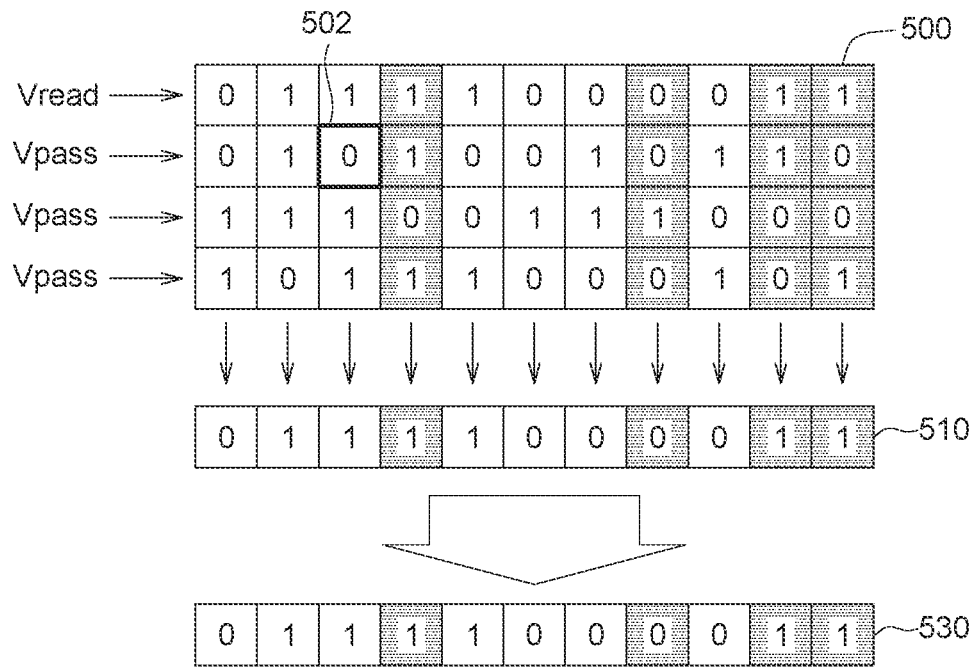
FIGS. 5A-5D show schematic diagrams of reading the data in the memory block row by row for checking and correction.

In FIG. 5A, the first driving circuit 102 applies a read voltage Vread to the first signal line SL1, and applies a pass voltage Vpass to the other first signal lines SL2~SLm, to read the data 510 stored in the memory unit U1-1~U1-11 on the first signal line SL1, i.e., 01111000011. The read data is input to the error correction circuit 110 for error checking and correction. After checking, the error correction circuit 110 obtains a result 530 that 01111000011 has no error bit.

Figure 5B:
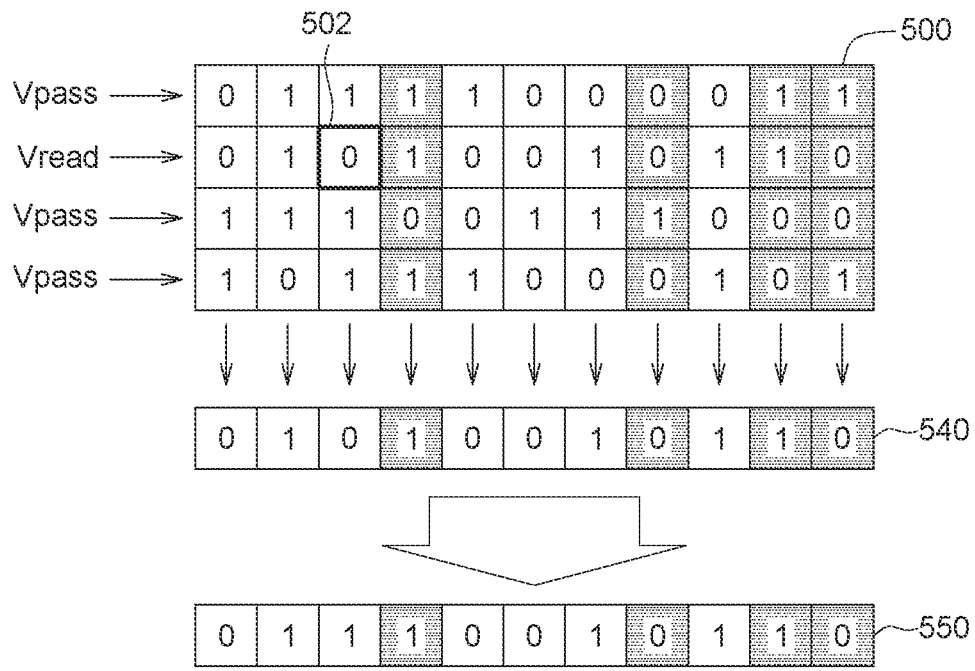

In FIG. 5B, the first driving circuit 102 applies a read voltage Vread to the first signal line SL2, and applies a pass voltage Vpass to the other first signal lines SL1, SL3~SLm, to read the data 540 stored in the memory unit U2-1~U2-11 on the first signal line SL2, i.e., 01010010110. The read data is input to the error correction circuit 110 for error checking and correction. After checking, the error correction circuit 110 obtains a result that 01010010110 has an error bit at the third bit from the left. Then, the error correction circuit 106 corrects the error bit from 0 to 1, and output the corrected data 550, i.e., 01110010110.

Figure 5C:
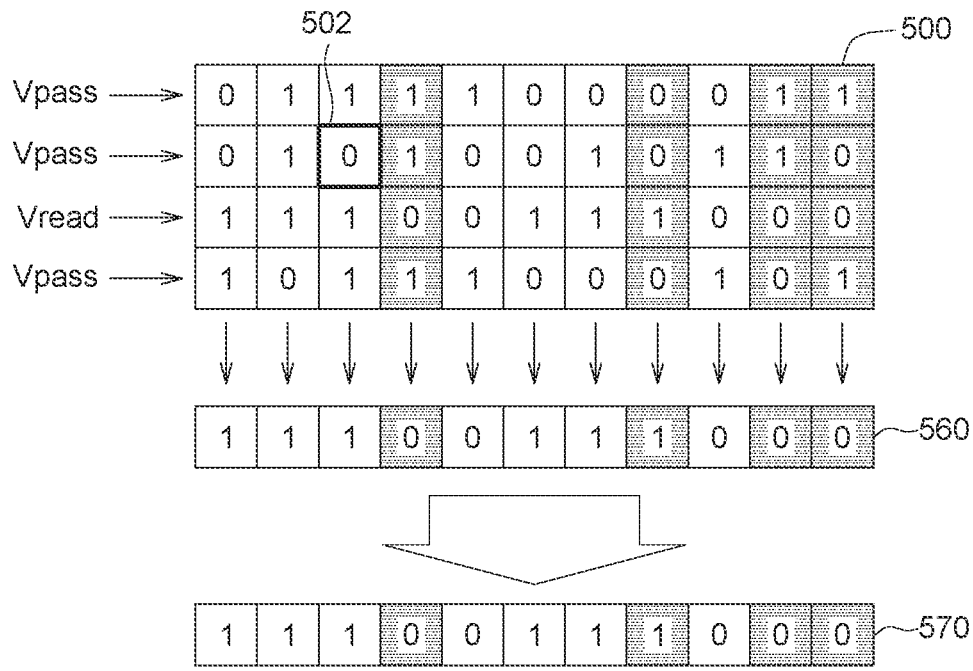
Figure 5D:
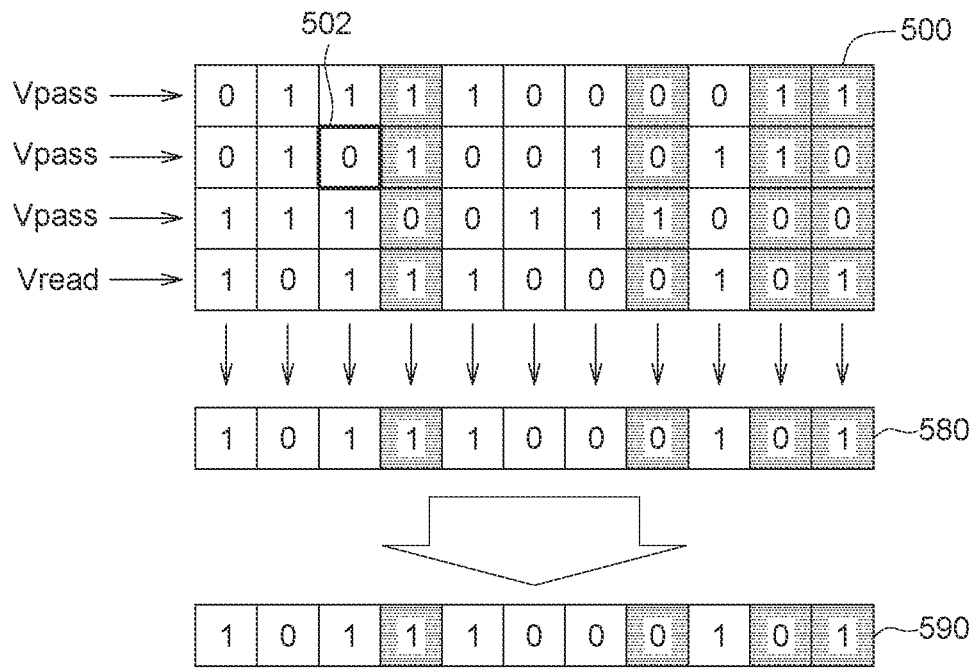

In FIG. 5C, the first driving circuit 102 applies a read voltage Vread to the first signal line SL4, and applies a pass voltage Vpass to the other first signal lines SL1~3, SL5~SLm, to read the data 580 stored in the memory unit U4-1~U4-11 on the first signal line SL4, i.e., 10111000101. The read data is input to the error correction circuit 110 for error checking and correction. After checking, the error correction circuit 110 obtains a result 590 that 10111000101 has no error bit.

In an embodiment, after the error correction circuit 110 obtains the result that the row of data has no error bit, the error correction circuit 110 could output a signal representing "no error" to the control circuit 112. While the control circuit 112 receives the signal representing "no error", the control circuit 112 would not modify the data stored in the rows of the memory units in the memory block 108-1 without error bit. For example, in the example of FIGS. 5A-5D, the control circuit 1112 would not modify the data stored in the memory units on the first signal lines SL1, SL3~SL4. In other hand, the error correction circuit 110 may output the corrected data corresponding to the data stored in the row of the memory units which is found to have error to the control circuit 112. The control circuit 112 may program the the memory units on the first signal line which have error according to the corrected data, to modify the wrong data to the correct data. For FIGS. 5A-5D, after the operation shown in FIG. 5B, the error correction circuit 110 may output the corrected data 550, i.e., 01110010110, to the control circuit 112, and the then the control circuit 112 may command the first driving circuit 102 and the second driving circuit 104 to respectively apply programming bias to the first signal lines SL1~SLm and the second signal lines BL1~BLn according to the corrected data 550, to program the memory unit U2-1~U2-n so that the data stored in the memory unit U2-3 would be modified from 0 to 1.

Figure 6:
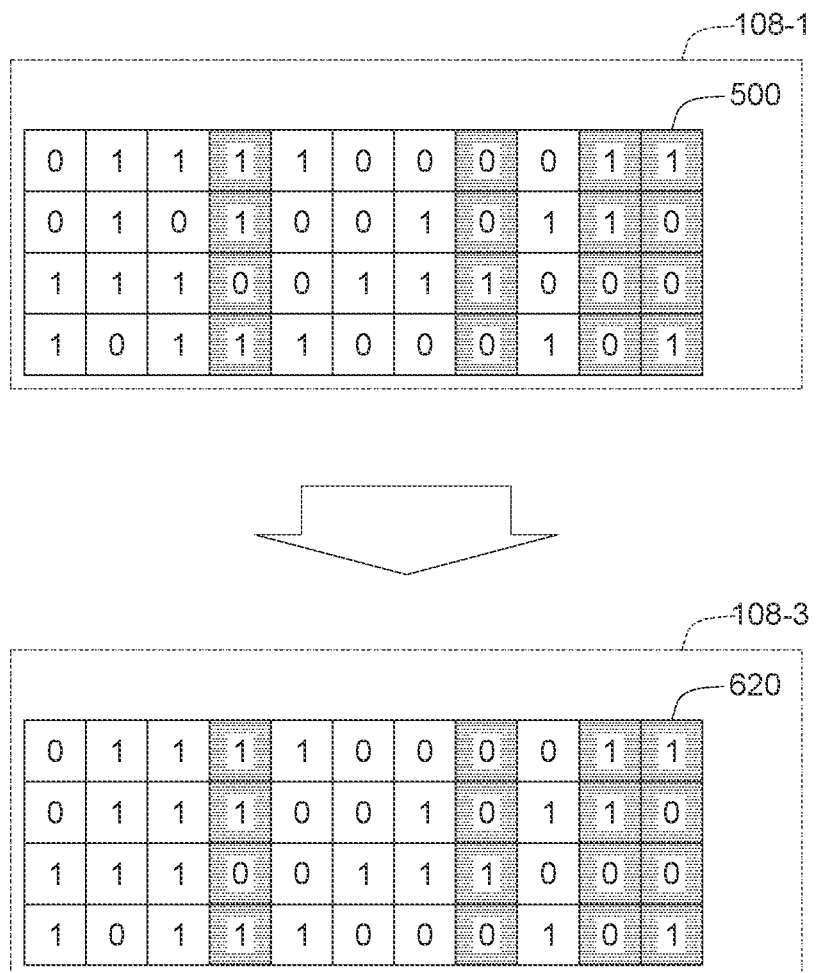
FIG. 6 shows a schematic diagram of programming the correct data obtained by checking and correction to another memory block.

In another embodiment, when the error correction circuit 110 obtains the result that the row of data has no error bit, the error correction circuit 110 may output the data which has been checked but no error is found as the corrected data (the same as the data read out). For example, in FIGS. 5A, 5C and 5D, after the error correction circuit 110 checks the read data 510, 560, 580 and no error is found, the error correction circuit 110 may output the data 530, 570, 590 which have been checked but not error is found as the corrected data (the same as the read data 510, 560, 580). The control circuit 112 may receive the corrected data (including the corrected data 530, 570, 590 corresponding to the data without error and the corrected data 550 obtained by correcting the data with error), and then command the first driving circuit 102 and the second driving circuit 104 to apply programming bias to another memory block, to program these corrected data to another memory block. For example, since the memory block 10-2 is performing the search operation and the memory block 108-1 is performing the error correction operation, the control circuit 112 would program the corrected data obtained by performing error correction operation for the memory block 108-1 to the memory block 108-3. As shown in FIG. 6, after the data set 500 originally stored in the memory block 108-1 is checked and corrected by the error correction circuit 110, the data set 620 formed by the corrected data corresponding to the data stored in the rows of data of the data set 500 is obtained, and the data set 620 is programmed to the memory block 108-3. Therefore, the data set originally stored in the memory block 108-1 would be considered to be "moved" to the memory block 108-3. That is, the data set 620 stored in the memory block 108-3 would be considered as the correct version of the data set 500, and the memory block 108-3 would replace the memory block 108-1 to perform the search operation.

Figure 7:
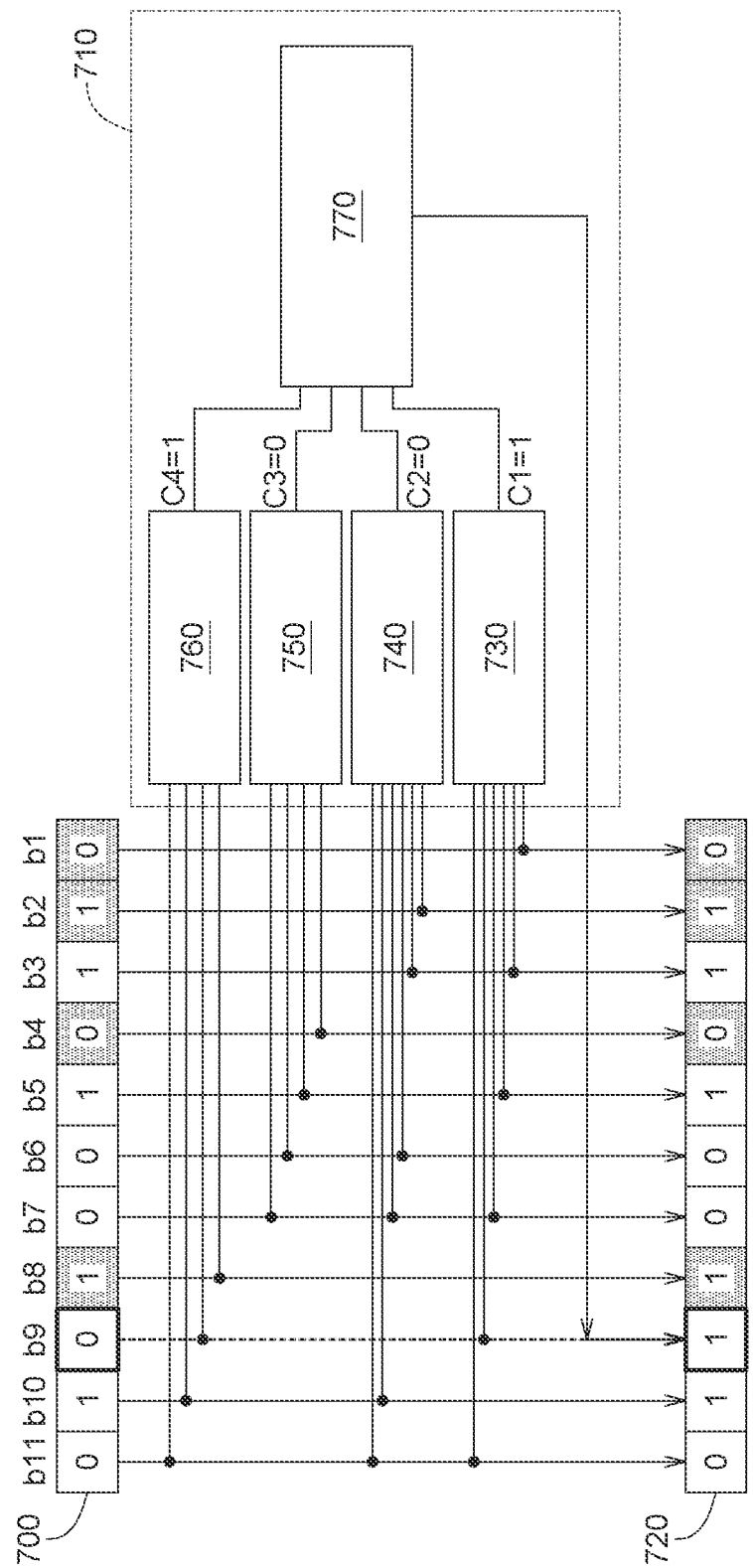
FIG. 7 shows a schematic diagram of operation of error correction circuit according to an embodiment of the present disclosure.

Referring to FIG. 7, FIG. 7 shows a schematic diagram of performing error correction according to an embodiment of the present disclosure. The data 700 is read from the memory units on the first signal line SL2 in FIG. 5B, wherein the bit b9 is the error bit. The logic 710 is an operation block equivalent to the error correction circuit. The bits b1, b3, b5, b7, b9, b11 are extracted and transmitted to the check unit 730 for even parity check, that is, to calculate whether the amount of bits with "1" is even (if yes, the check result is 1; if no, the check result is 0), and C1=1 is obtained. The bits b2, b3, b6, b7, b10, b11 are extracted and transmitted to the check unit 740 for even parity check, and C2=0 is obtained. The bits b4, b5, b6, b7 are extracted and transmitted to the check unit 750 for even parity check, and C3=0 is obtained. The bits b8, b9, b10, b11 are extracted and transmitted to the check unit 760 for even parity check, and C4=1 is obtained. Next, the output of the check units 730~760 are transmitted to the calculation unit 770 for calculating N=8*C4+4*C3+2*C2+C1. If N is 0, it represents that there is no error, if N is not 0, it represents that the N-th bit from the less significant bit (LSB) is the error bit. In this embodiment, since LSB is the bit b1 and N is 9, it represents that the ninth bit b9 from the bit b1 is the error bit. Therefore, the calculation unit 770 would modify the ninth bit b9 from 0 to 1 according to the calculation result, to obtain and output the corrected data 720.

Figure 8:
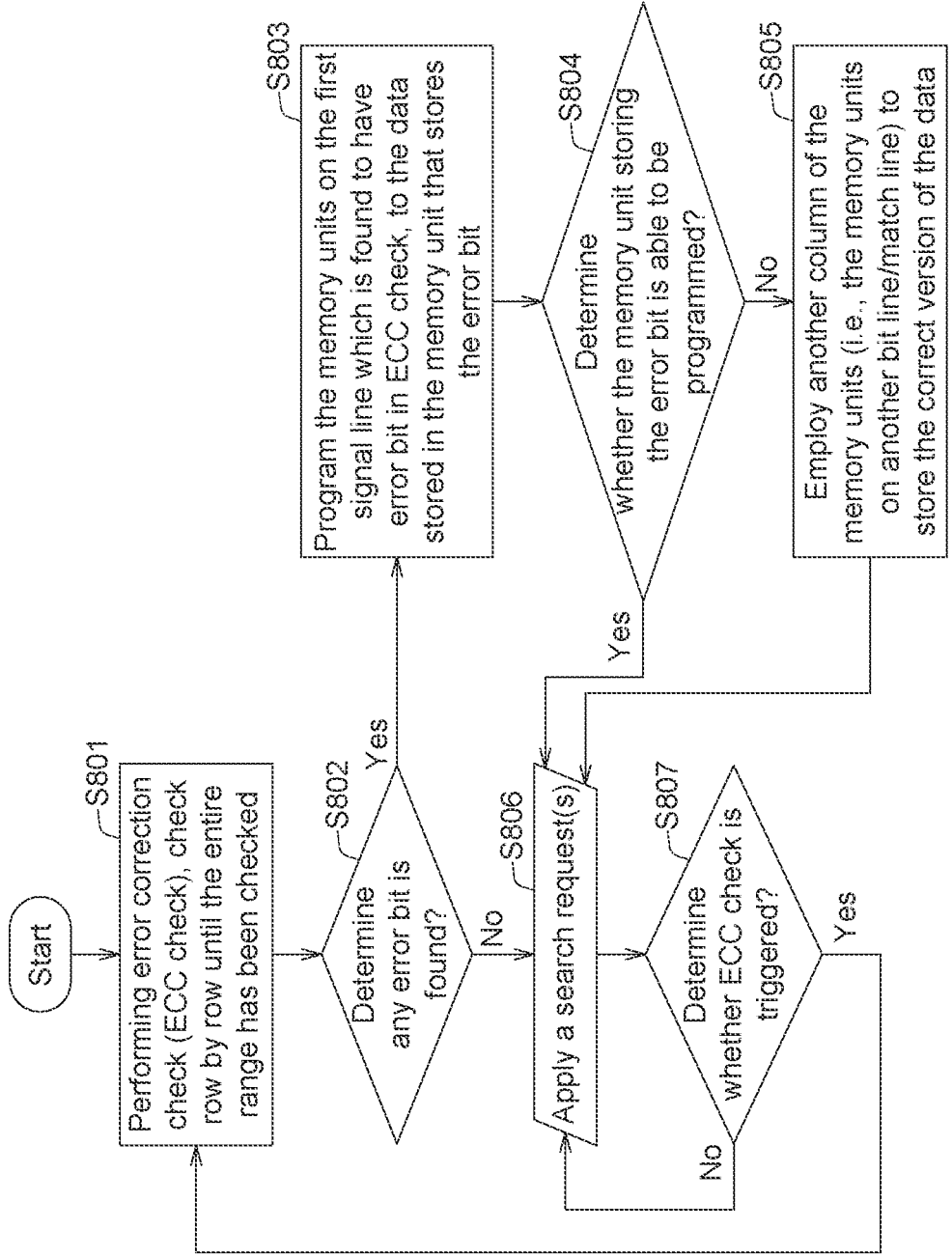
FIG. 8 shows a flowchart of operation of memory device according to an embodiment of the present disclosure.

Referring to FIG. 8, FIG. 8 shows a flowchart of operation of memory device according to an embodiment of the present disclosure.

At step S801, performing error correction check (ECC check), check row by row until the entire range has been checked. The entire range refers to the memory units that stores data in the memory block. That is, the memory units without storing data could not perform ECC check. For example, in the example shown in FIGS. 5A-5D, although the memory block 108-1 actually has m rows of the memory units, only four rows of the memory unit, that is, the memory units on the first signal line SL1~SL4 would be read when the error correction operation is performed.

At step S802, determine any error bit is found. If yes, perform S803: if no, perform S806. Referring to the above description, step S802 could be performed by the error correction circuit 110.

At step S803, program the memory units on the first signal line which is found to have error bit in ECC check, to the data stored in the memory unit that stores the error bit. The control circuit 112 could determine to program the memory units on which of the first signal lines based on the result of ECC check provided by the error correction circuit 110. This approach is suitable for applying to the memory type that allow a single word line to perform programming operation.

At step S804, determine whether the memory unit storing the error bit is able to be programmed. If yes, perform S805; if no, perform S805. The control circuit 112 could perform verification after the memory unit on the first signal line which is found to have error in ECC check according to the output of the error correction circuit 110, to confirm whether the programmed data in the row of the memory units is identical to the data should be programmed (the correct data). The reason why the error bit stored in the memory unit cannot be changed through reprogramming may be that the memory unit is damaged.

At step S805, employ another column of the memory units (i.e., the memory units on another bit line/match line) to store the data. Since the reason why the error bit stored in the memory unit cannot be changed through reprogramming may be that the memory unit is damaged, the control circuit 112 would select the memory units on another bit line/match line to store the the correct version of the user data stored in the column of the memory units which has the memory unit cannot be reprogrammed. Taking FIG. 2 and FIG. 5B as an example, if the memory unit U2-3 cannot be reprogrammed to store the correct data, the control circuit 112 may program the correct version of the user data stored in the memory units U1-3~U4-3 on the second signal line BL3 (that is, 1111, not 1011) to the memory units U1-12~U4-12 on the second signal line BL12.

At step S806, apply search request(s).

At step S807, determine whether ECC check is triggered. If yes, perform S801; if no, perform S806.

The process in this embodiment could be performed for the memory blocks of the memory device respectively.

When the search operation is performed, the check columns that are used for storing check codes could not be searched or the search result therefrom could not be output. In an embodiment, when the control circuit 112 performs the search operation on the memory block, the control circuit could command the second driving circuit not to apply search bias to the second signal lines corresponding to the check columns. In another embodiment, when the control circuit 112 performs the search operation on the memory block, the control circuit could command the sensing circuit not to detect the current flow out from the third signal lines corresponding to the check columns. The specific implementation is, for example, disabling the current sensing units (e.g., sensing amplifier) of the sensing circuit for sensing the third signal lines corresponding to the check columns.

In an embodiment, the position and the amount of the check columns are fixed. In another embodiment, the position and the amount of the check columns is not fixed, for example, dynamic configured by the control circuit 112.

In the other hand, the present disclosure could be combined with an error correction mechanism for search input to achieve better search result reliability. For example, an error correction circuit for search input data (data to be searched) could be configured in the first driving circuit, to ensure that the search voltage applied to the memory block by the first driving circuit corresponds to the data to be searched.

The present disclosure could perform the error correction operation on the memory block that is not in the search operation, so as to increase the accuracy of the data set stored in the memory block. In this way, the search operation could be performed on the correct data set, thereby improving the reliability of the search result.

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory device, comprising:
    a plurality of memory blocks, each of the memory blocks comprising a plurality of memory units;
    a plurality of driving circuits, coupled to the memory blocks;
    an error correction circuit, coupled to the memory blocks; and
    a control circuit, coupled to the driving circuits and the error correction circuit, configured to select one of the memory blocks as a target block, and perform an error correction operation on the target block, the memory units of the target block having a plurality of columns and a plurality of rows, the columns comprising at least one data column and at least one check column, data stored in the memory units of the at least one data column being user data, data stored in the memory units of the at least one check column being check codes, the at least one check code stored in each of the rows of the memory units generated according to the user data stored in the same row of the memory units;
    wherein the error correction operation comprises reading the rows of the memory units of the target block row by row, transmitting the data stored in the rows of the memory units of the target block to the error correction circuit, checking and correcting, by the error correction circuit, whether the user data stored in each of the rows of the memory units has error bit according to the at least one check code stored in each of the rows of the memory units to generate a corrected data;
    wherein in the target block, the row of the memory units, where the stored user data is checked to have error bit, is programmed according to the corrected data corresponding to the data stored in the row of the memory units; and
    wherein for a column of the memory units which has an error but is not able to be modified by programming, a correct version of the data stored in the column of the memory units is programmed to another column of the memory units in the target block.

2. The memory device according to claim 1, wherein the corrected data corresponding to the data stored in each of the rows of the memory units in the target block is programmed to another one of the memory blocks.

3. The memory device according to claim 1, wherein the driving circuit comprises a bit line driving circuit, when performing a search operation on the target block, the bit line driving circuit free of applying a search bias on at least one bit line corresponding to the at least one check column.

4. The memory device according to claim 1, wherein when performing a search operation on the target block, the sensing circuit free of detecting a current flow out from at least one match line corresponding to the at least one check column.

5. The memory device according to claim 1, wherein after the control circuit select the target block, the control circuit determines whether to perform the error correction operation on the target block according to at least one of a maintenance time and read times of the target block.

6. The memory device according to claim 1, wherein the control circuit selects one of the memory blocks which are in an idle state as the target block.

7. An operation method of memory device, comprising:
    selecting one of a plurality of memory blocks as a target block for performing an error correction operation, the target block comprising a plurality of memory units, the memory units having a plurality of columns and a plurality of rows, the columns comprising at least one data column and at least one check column, data stored in the memory units of the at least one data column being user data, data stored in the memory units of the at least one check column being check codes, the at least one check code stored in each of the rows of the memory units generated according to the user data stored in the same row of the memory units;
    reading the rows of the memory units of the target block row by row;
    transmitting the data stored in the rows of the memory units of the target block to an error correction circuit;
    checking and correcting, by the error correction circuit, whether the user data stored in each of the rows of the memory units has error bit according to the at least one check code stored in each of the rows of the memory units to generate a corrected data; and
    in the target block, programming the row of the memory units, where the stored user data is checked to have error bit, according to the corrected data corresponding to the data stored in the row of the memory units;
    wherein for a column of the memory units which has an error but is not able to be modified by programming, a correct version of the data stored in the column of the memory units is programmed to another column of the memory units in the target block.

8. The operation method according to claim 7, further comprising:
    programming the corrected data corresponding to the data stored in each of the rows of the memory units in the target block to another one of the memory blocks.

9. The operation method according to claim 7, further comprising:
    when performing a search operation on the target block, free of applying a search bias on at least one bit line corresponding to the at least one check column.

10. The operation method according to claim 7, further comprising:
    when performing a search operation on the target block, free of detecting a current flow out from at least one match line corresponding to the at least one check column.

11. The operation method according to claim 7, wherein after selecting the target block, determine whether to perform the error correction operation on the target block according to at least one of a maintenance time and read times of the target block.

12. The operation method according to claim 7, wherein one of the memory blocks which is in an idle state is selected as the target block.

13. A memory block, comprising:
a plurality of memory units, the memory units having a plurality of columns and a plurality of rows, the rows of the memory units coupled to a first driving circuit via a plurality of first signal lines, the columns of the memory units coupled to a second driving circuit via a plurality of second signal lines and coupled to a sensing circuit via a plurality of third signal lines, the memory units further coupled to an error correction circuit, the columns comprising at least one data column and at least one check column, data stored in the memory units of the at least one data column being user data, data stored in the memory units of the at least one check column being check codes, the at least one check code stored in each of the rows of the memory units generated according to the user data stored in the same row of the memory units,
wherein the row of the memory units, where the stored user data is checked to have error bit, is programmed according to the corrected data corresponding to the data stored in the row of the memory units and for a column of the memory units which has an error but is not able to be modified by programming, a correct version of the data stored in the column of the memory units is programmed to another column of the memory units.

14. The memory block according to claim 13, wherein in response to a request of performing an error correction operation, the memory block outputs and transmits the data stored in the rows of the memory units to the error correction circuit row by row, so that the error correction circuit checks and corrects whether the user data stored in each of the rows of the memory units has error bit according to the at least one check code stored in each of the rows of the memory units to generate a corrected data.

15. The memory block according to claim 13, wherein in response to a request of performing search operation, the at least one check column is free of output current to the sensing circuit.

* * * * *